(12) United States Patent
Yamasaki et al.

(10) Patent No.: US 7,810,412 B2
(45) Date of Patent: Oct. 12, 2010

(54) GEARBOX

(75) Inventors: Yasumasa Yamasaki, Kurashiki (JP); Takuya Yoshimura, Hachioji (JP)

(73) Assignee: Sumitomo Heavy Industries, Ltd., Shinagawa-Ku, Tokyo (JP)

( * ) Notice: Subject to any disclaimer, the term of this patent is extended or adjusted under 35 U.S.C. 154(b) by 639 days.

(21) Appl. No.: 11/325,531

(22) Filed: Jan. 5, 2006

(65) Prior Publication Data
US 2006/0156861 A1     Jul. 20, 2006

(30) Foreign Application Priority Data
Jan. 6, 2005     (JP)     ............... 2005-001809

(51) Int. Cl.
*F16C 3/00*     (2006.01)
*F16H 57/02*     (2006.01)
*F16H 57/04*     (2006.01)
*F16H 61/00*     (2006.01)
(52) U.S. Cl. ................... 74/606 R; 464/180
(58) Field of Classification Search ............... 74/606 R; 464/180
See application file for complete search history.

(56) References Cited
U.S. PATENT DOCUMENTS

| | | | | |
|---|---|---|---|---|
| 2,237,958 A | * | 4/1941 | Hansen et al. ............ | 74/606 R |
| 2,822,700 A | * | 2/1958 | Eunis ..................... | 74/411 |
| 4,108,021 A | * | 8/1978 | MacAfee et al. ......... | 74/606 R |
| 4,435,994 A | * | 3/1984 | Hata et al. .............. | 74/606 R |
| 4,686,868 A | * | 8/1987 | Heidrich ................. | 74/606 R |
| 5,125,289 A | | 6/1992 | Heidrich | |
| 6,729,206 B2 | * | 5/2004 | Hayabuchi et al. ....... | 74/606 R |
| 2002/0043128 A1 | * | 4/2002 | Cooper ................... | 74/606 R |
| 2007/0131196 A1 | * | 6/2007 | Gibson et al. ............ | 123/198 F |

FOREIGN PATENT DOCUMENTS

| | | |
|---|---|---|
| JP | 50-125159 | 10/1975 |
| JP | 56-30653 | 3/1981 |
| JP | 62-156663 | 10/1987 |
| JP | 02-266150 | 10/1990 |
| JP | 05306745 A * | 11/1993 |

OTHER PUBLICATIONS

Technical Memorandum 103691 from NASA, Oct. 15-16, 1991.*
Translation of JP 02266150 Jun. 4, 2010.*

* cited by examiner

*Primary Examiner*—Tisha D Lewis
(74) *Attorney, Agent, or Firm*—Squire, Sanders & Dempsey, LLP

(57) ABSTRACT

In a gearbox including three or more shaft holes, a vibration suppressor is formed with the gearbox and extends from at least one of shaft hole in a radial direction of the shaft hole. The vibration suppressor ensures a width which is greater than or equal to one fourth of the shaft hole diameter of the shaft hole, and a height that is greater than or equal to one sixth of the shaft hole diameter at a highest portion of the bivration suppressor.

6 Claims, 6 Drawing Sheets

GEARBOX

BACKGROUND OF THE INVENTION

1. Field of the Invention

The present invention relates to a gearbox for use with a speed reducer or the like.

2. Description of the Related Art

Various speed reducers have been conventionally used in power transmission systems for driving, industrial equipment in factories. In general, the speed reducer includes a gear transmission mechanism of a particular structure within a predetermined gearbox. In the gear transmission mechanism, the gears are meshed with each other, thereby periodic vibrations which depend on the number of teeth and the rotational speed are generated due to collision of tooth surfaces and slight deformation of the tooth surfaces, so that the so-called gear noise develops. Once the center frequency of the gear noise has become equivalent to the natural frequency of each member in the speed reducer, especially, that of the gearbox, or to an integral multiple of the natural frequency thereof, the noise might be further amplified because of a resonance phenomenon.

In recent years, efforts have been made to improve working environments such as in factories. This trend has brought about a serious challenge to reduction of noise that is produced by the speed reducer.

The gearbox is larger in size than any other members in the speed reducer, with its wall surfaces more likely to amplify vibrations. Therefore, the gearbox has a large influence on noise generated by the whole speed reducer.

To address these problems, a structure with a gearbox having an increased-thickness portion at the center of its walls is suggested, e.g., in Japanese Patent Laid-Open Publication No. 1975-125159.

However, any conventional countermeasures of this type against noise are based on the concept of enhancing the rigidity of the gearbox, and have not been always successfully taken in practice to effectively reduce the noise.

The gearbox is classified into two types: one type with an input shaft and an output shaft arranged coaxially, and the other type with an input shaft and an output shaft arranged non-coaxially. Of these types, in particular, the gearbox with an input shaft and an output shaft arranged non-coaxially has a larger number of shaft holes, in each of which disposed is a shaft acting as a vibration source. This structure thus raised a problem that vibration inducing force on each shaft is transmitted to the entire gearbox, thereby causing resonance to more likely occur.

SUMMARY OF THE INVENTION

In view of the foregoing problems, various exemplary embodiments of this invention provide a gearbox which adopts an organic combination of an inventive idea on a gearbox shape and a rigidity enhancement countermeasure to realize a substantial reduction in noise with a minimized increase in weight.

To solve the aforementioned problems, the present invention provides a gearbox which has at least three or more shaft holes. The gearbox is configured such that a vibration suppressor is formed to extend from at least one of the shaft holes in a radial direction of the one shaft hole. The vibration suppressor is configured to ensure a width greater than or equal to at least one fourth of a shaft hole diameter of the one shaft hole and a height greater than or equal to at least one sixth of the shaft hole diameter at the highest portion.

The rigidity of a gearbox is very closely related to the occurrence of vibration and noise. It is thus necessary to improve the rigidity of the members that constitute the gearbox in order to reduce noise. However, a straightforward enhancement of rigidity (as typically practiced) will involve an increase in weight. In some cases, this may cause decreases in natural frequency of the gearbox, thus not always contributing to reduction in noise. From this point of view, the present invention was developed in terms of shape and mass of the gearbox, especially with attention focused on the natural frequency of the gearbox, to provide the countermeasure that best contributes to reduction in noise.

According to the present invention, the vibration suppressor is formed to extend from a shaft hole of a gearbox in a radial direction of the shaft hole. The vibration suppressor is formed to extend radially from a shaft hole because various experiments showed that this way of forming the vibration suppressor led to the greatest vibration suppression effect with the least increase in mass.

The present invention can provide a gearbox which adopts an organic combination of an inventive idea on a gearbox shape and a rigidity enhancement countermeasure to realize a substantial reduction in noise with a minimized increase in weight.

DETAILED DESCRIPTION OF THE PREFERRED EMBODIMENTS

Now, a description will be given to one exemplary embodiment according to the present invention with reference to the accompanying drawings.

Figure 1:
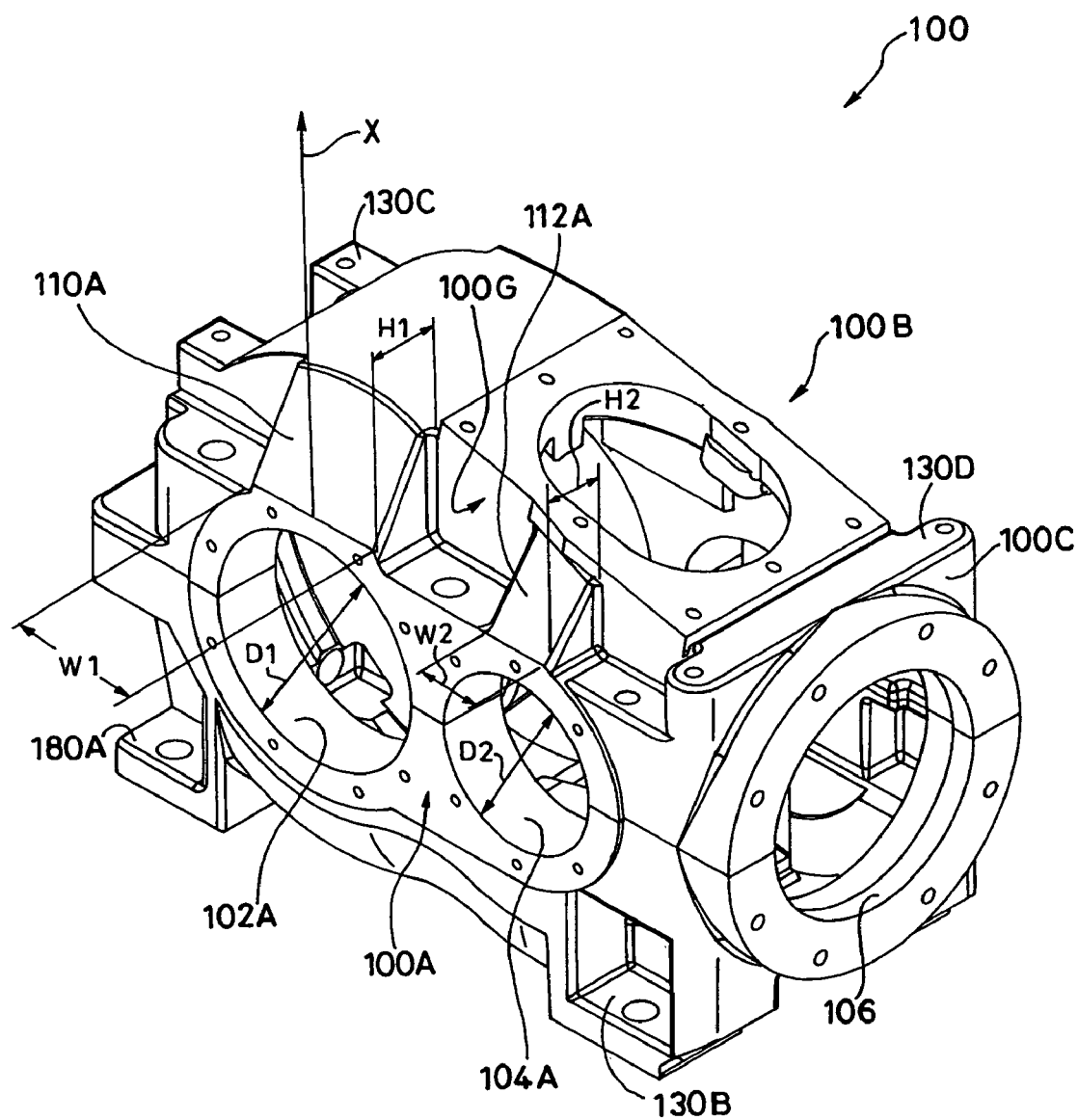
FIG. 1 is a perspective view of a gearbox according to one exemplary embodiment of the present invention, with its front side viewed diagonally from above.
Figure 2:
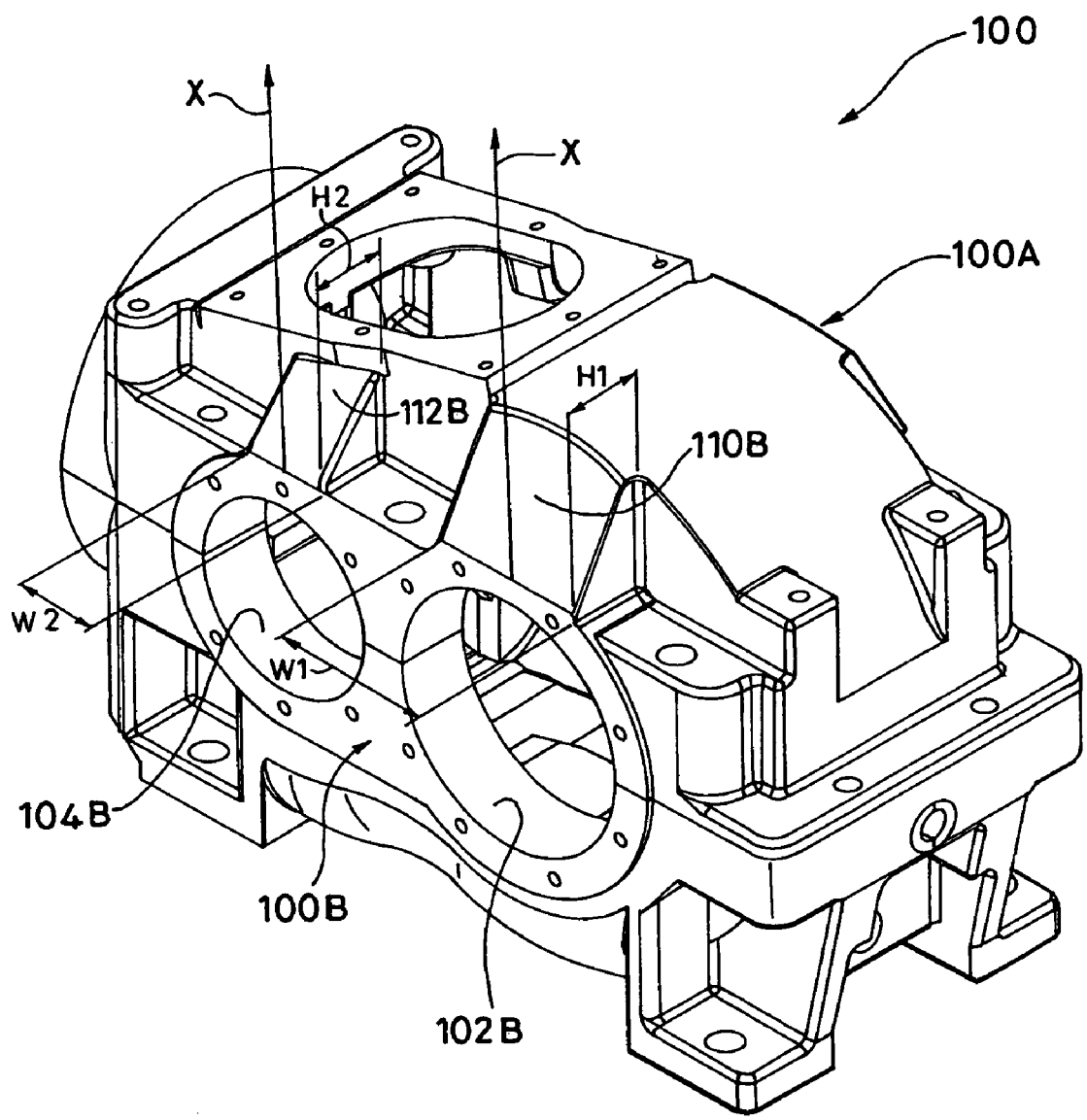
FIG. 2 is a perspective view of the gearbox with its rear side viewed diagonally from above.
Figure 3:
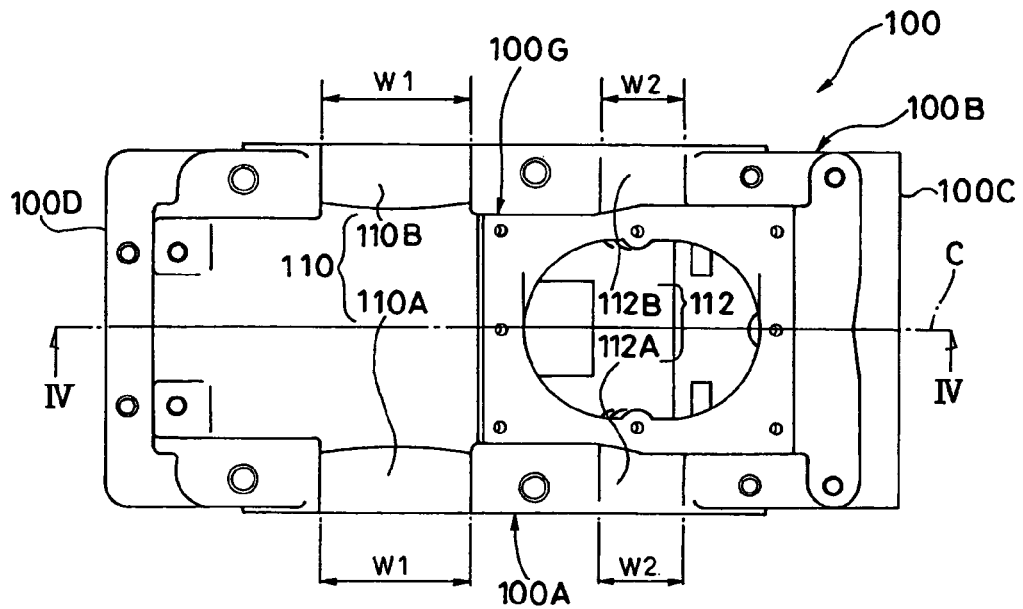
FIG. 3 is a plan view of the gearbox.

FIG. 1 is a perspective view of a gearbox 100 according to the exemplary embodiment of the present invention, with its front side viewed diagonally from above, FIG. 2 also being a perspective view thereof with its rear side viewed from above. FIG. 3 is a plan view illustrating the gearbox 100, FIG. 4 being a sectional view taken along the line IV-IV of FIG. 3, FIGS. 5 to 10 being a sectional view or a side view when taken along the lines V-V to X-X of FIG. 4, respectively.

As can be seen clearly from each figure, the gearbox 100 is symmetrical with respect to the centerline C. On a front side 100A and a rear side 100B of the gearbox 100, included are a first pair of shaft holes 102 (102A and 102B), into which an intermediate shaft (not shown) is to be inserted, and a second pair of shaft holes 104 (104A and 104B), into which an output shaft (not shown) is to be inserted. The first shaft holes 102 and the second shaft holes 104 are disposed (non-coaxially) such that the intermediate shaft and the output shaft to be inserted therein are arranged to be parallel to each other.

The gearbox 100 is also designed to include a third shaft hole 106 on a side 100C of the gearbox 100 so as to allow an input shaft (not shown) to be inserted therethrough. Power is transmitted from the input shaft to the intermediate shaft via bevel gears (orthogonal gears: not shown). After all, the gearbox 100 has a total of five shaft holes 102A, 102B, 104A, 104B, and 106 formed thereon.

The gearbox has first vibration suppressors 110 (110A and 10B) which are formed integrally with the gearbox to extend in a radial direction X (upwardly in the figure) from the first pair of shaft holes 102 (102A and 102B), respectively. The gearbox also has second vibration suppressors 112 (112A and 112B) which are formed integrally with the gearbox to extend in a radial direction X (upwardly in the figure) from the second pair of shaft holes 104 (104A and 104B), respectively.

In this exemplary embodiment, the first and second vibration suppressors 110 and 112 have heights H1 and H2 (an axial height or thickness) of 60 mm, respectively. The first and second vibration suppressors 110 and 112 at the shaft hole side are flush with the front edges 120 (120A and 120B) and 122 (122A and 122B) of the corresponding shaft holes 102 and 104, respectively. That is, each of the shaft holes 102 and 104 has an axial length of height H1 (H2), while the front edges 120 (120A and 120B) and 122 (122A and 122B) protrude axially outwardly with respect to an axial edge 100G of the gear housing portion.

The first and second vibration suppressors 110 and 112 are designed such that the heights thereof are linearly reduced from H1 and H2 with radial distance from the first shaft holes 102 and the second shaft holes 104, respectively. That is, as can be seen clearly from the sectional views of FIGS. 6 and 8, the first and second vibration suppressors 110 and 112 are generally triangular in an axially parallel, vertical cross section. This arrangement is intended to prevent an increase in weight while maintaining a high rigidity unchanged, thereby increasing the natural frequency of the gearbox 100.

In this exemplary embodiment, the first and second vibration suppressors 110 and 112 have widths W1 and W2 (a width at right angle to the radial direction X) of 130 mm and 70 mm, respectively. The first shaft holes 102 have a shaft hole diameter D1 of 200 mm, and the second shaft holes 104A and 104B have a shaft hole diameter D2 of 150 mm. Thus, this exemplary embodiment provides a W1/D1 (width to shaft hole diameter ratio) of 0.65 and a W2/D2 of 0.47. Both values are far greater than one fourth, and the vibration suppressors can be said to be extraordinarily wide as a rib or a reinforcing material for enhancing the rigidity around the shaft.

On the other hand, the first and second vibration suppressors 110 and 112 have the heights H1 and H2 of 60 mm, respectively, thus providing height to shaft hole diameter ratios, H1/D1=0.3 and H2/D2=0.4, both of which are far greater than one eighth.

In this exemplary embodiment, the gearbox 100 has a general side thickness w of 10 mm, so that the heights H1 and H2 of 60 mm are about six times larger than that. The axial heights H1 and H2 are preferably five times or more larger than the general side thickness w.

Figure 4:
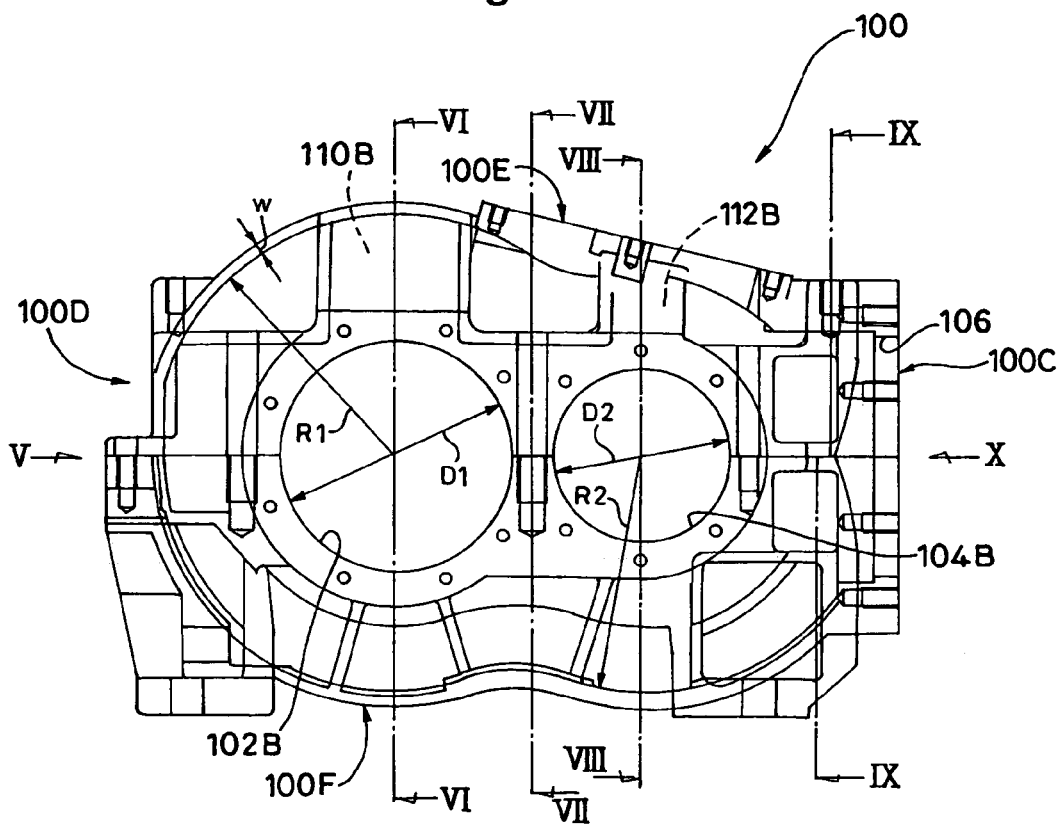
FIG. 4 is a sectional view of the gearbox taken along the line IV-IV of FIG. 3.
Figure 5:
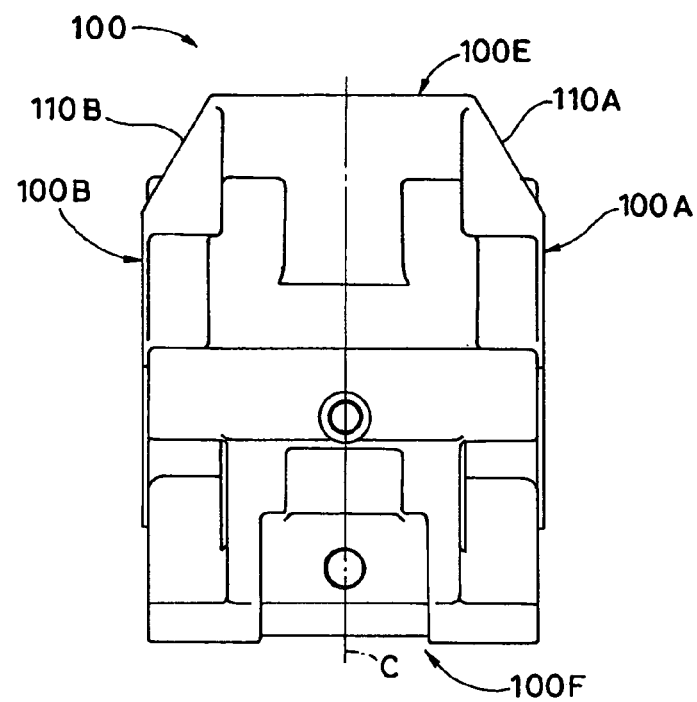
FIG. 5 is a sectional view taken along the line V-V of FIG. 4.
Figure 6:
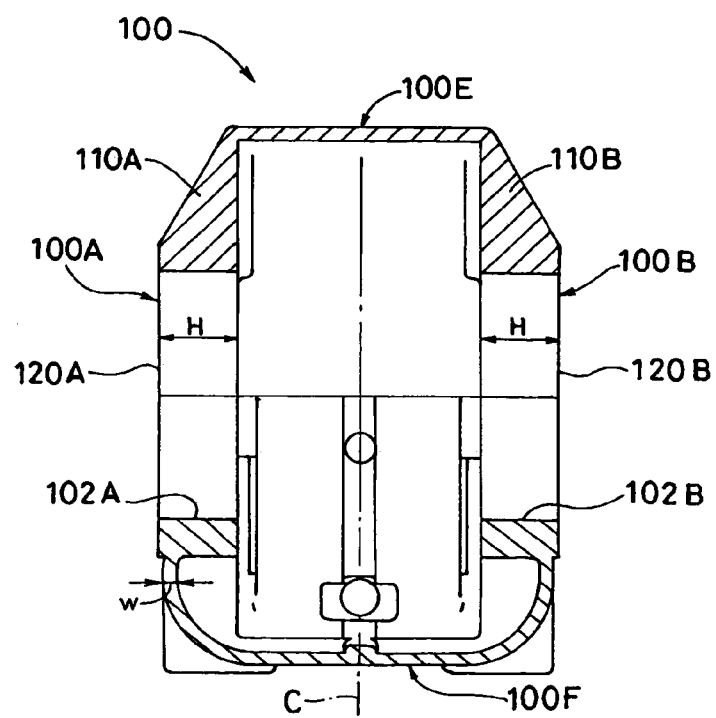
FIG. 6 is a sectional view taken along the line VI-VI of FIG. 4.
Figure 7:
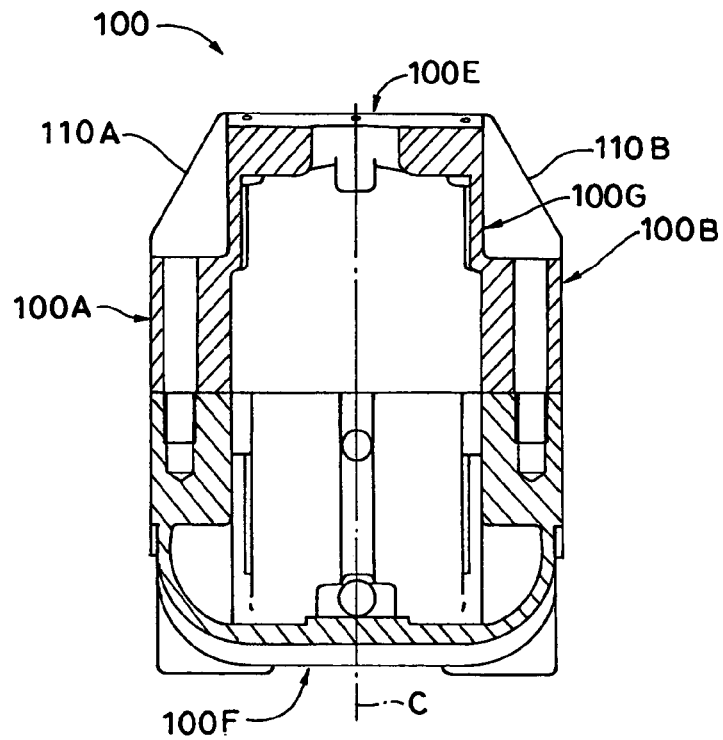
FIG. 7 is a sectional view taken along the line VII-VII of FIG. 4.
Figure 8:
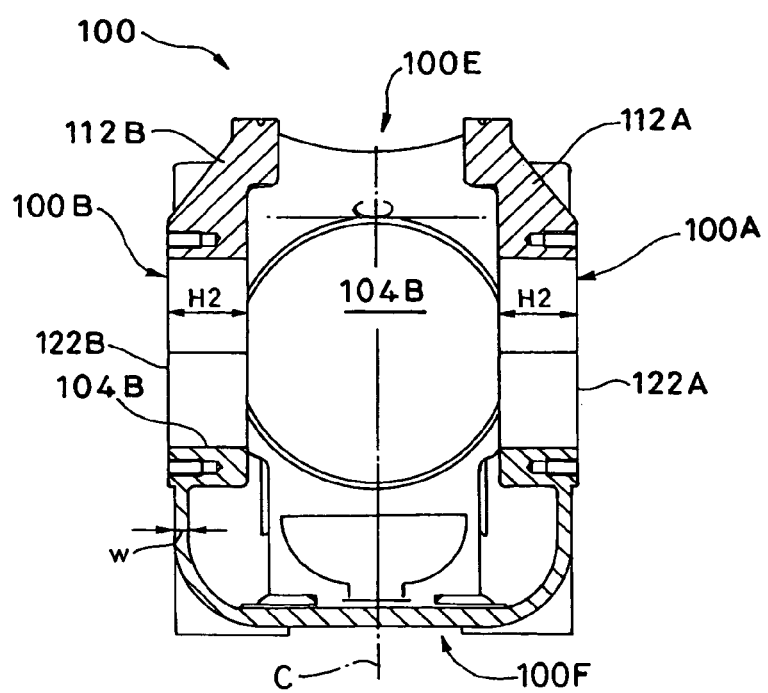
FIG. 8 is a sectional view taken along the line VIII-VIII of FIG. 4.
Figure 9:
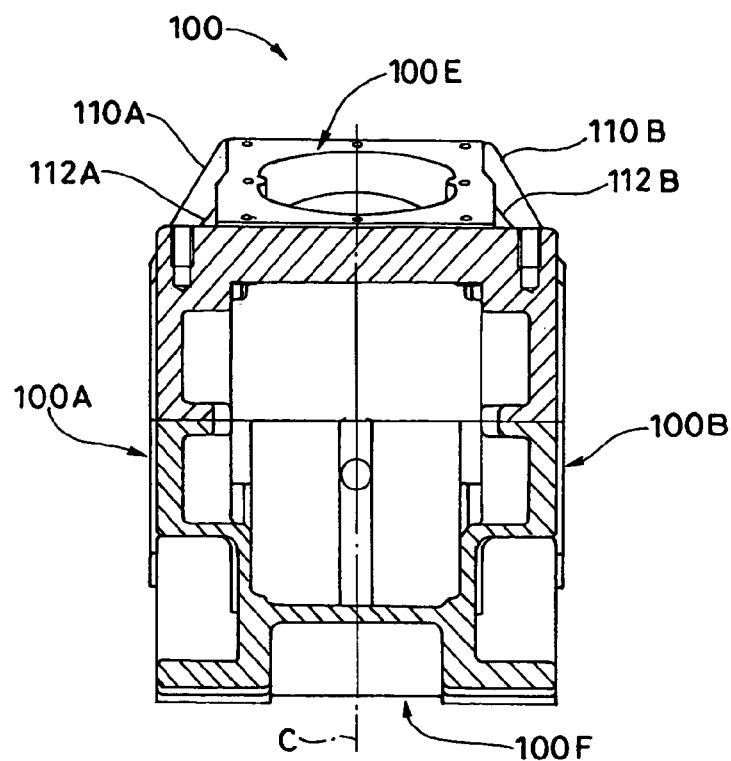
FIG. 9 is a sectional view taken along the line IX-IX of FIG. 4.
Figure 10:
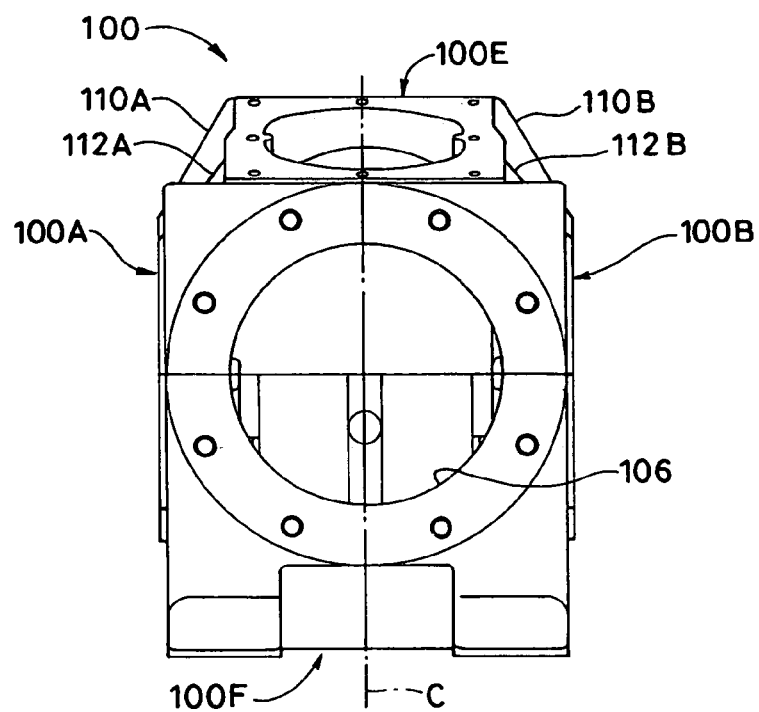
FIG. 10 is a sectional view taken along the line X-X of FIG. 4.

The gearbox 100 is generally a cuboid; however, as can be seen clearly from FIG. 4, except flange portions 130A, 130B, and 130C used for installation, most part of the outer shape of the gearbox 100 is formed concentrically spaced apart from the output shaft and the intermediate shaft by R1 and R2, respectively.

Now, a description is given to the operation of the gearbox 100.

The largest noise source in the gearbox 100 is the gears mounted within the gearbox 100 which mesh with each other producing gear noise. For example, suppose that the shaft rotates at 1800 rpm and the gear mounted on the shaft has 14 teeth. In this case, when the gear meshes with the partner gear, the tooth surfaces collide with each other (14×1800)/60=420 times per second, thus producing a gear noise at a center frequency of 420 Hz. This gear noise is transmitted to the gearbox 100 via the shafts incorporating the gears (and the bearings). Accordingly, the enhancement of rigidity around the shaft of the gearbox 100 is basically effective from the viewpoint of reduction in noise.

The rigidity around the shaft may be conceivably enhanced by: A) using a high-rigidity material at a portion around the shaft of the gearbox 100, or B) disposing a rib at a portion around the shaft of the gearbox 100. However, A) using a high-rigidity material at a portion around the shaft may lead to drawbacks such as an increase in manufacturing costs and manufacturing steps, without much effects on reduction in noise (even with sufficient strength-wise merits). In the case of B) disposing a rib at a portion around the shaft, the rib is in general provided with a width typically about the same as the general side thickness w of the gearbox 100 from the material-mechanics-wise rationality point of view. However, it has been confirmed that a narrow rib of this type can not be expected to provide a sufficient effect on reduction in noise.

In contrast, this exemplary embodiment ensures that the first and second vibration suppressors 110 and 112 have widths w1 and w2 which are greater than one third of the shaft hole diameters D1 and D2 of the shaft holes 102 and 104, and heights H1 and H2 that are greater than one fourth of the shaft hole diameters D1 and D2, respectively. This shape, which no longer stays within the concept of a rib serving for enhancement of rigidity, has a great effect on reduction in noise.

This may be presumably considered due to an increase in natural frequency of the gearbox 100. The higher the rigidity and the lower the weight, the higher the natural frequency tends to become. As described above, this configuration makes it possible to easily increase the natural frequency of the gearbox 100 to 2 kHz or more, which has been experimentally confirmed. Once the gearbox 100 is increased in natural frequency to 2 kHz or more, the gearbox 100 cannot practically vibrate with a larger amplitude due to its overall inertial mass, thereby naturally resulting in its vibration (or noise generation) level itself being reduced.

On the other hand, the gear noise may include, e.g., referring to the aforementioned example, a fundamental harmonic of 420 Hz and harmonics 840 Hz, 1,260 Hz, 1,680 Hz, . . . , of the order 2, 3, 4, . . . . Those harmonics of the third order or higher tend to extremely reduce in level. For this reason, for example, when the gearbox 100 is increased in natural frequency, e.g., up to about 2 kHz, (even if the first order frequency is varied) the gear noise harmonics of the 3rd order or the 4th order or higher may cause resonance, thus resulting in the resonance level being significantly lowered.

This phenomenon can also be understood from the fact that the human ear can most easily hear sound at frequencies of several hundred Hz to 1 kHz, and thus an increase in natural frequency may cause the human ear not to capture the sound as noise.

Furthermore, unlike a typical box-like shape, the most part of the outer shape of the gearbox 100 according to this embodiment is formed concentrically spaced apart from the output shaft and the intermediate shaft by R1 and R2, respectively. For this reason, both the sides 100C and 100D, and the top and bottom 100E and 100F of the gearbox 100 provide substantial vibration suppression effects. In cooperation with the presence of the first and second vibration suppressors 110 and 112, the effects conceivably cause vibrations to occur with difficulty especially at lower frequencies even without a substantial thickness (w), thereby resulting in the natural frequency being increased.

Furthermore, both the first shaft holes 102 and the second shaft holes 104 are provided with the first and second vibration suppressors 110 and 112, respectively, and the portions around both the first shaft holes 102 and the second shaft holes 104 are continuously integrated in part with each other. Accordingly, the rigidity around the shafts is further enhanced.

Still furthermore, the first and second vibration suppressors 110 and 112 are formed in the shape of a triangle in cross section to be thereby reduced in weight without a decrease in rigidity.

It is presumably considered that these arrangements contribute synergistically to an increase in natural frequency.

In the case of the vibration suppressor according to the present invention, even one vibration suppressor has a substantial noise reduction effect (although a plurality of vibration suppressors may also be employed). Furthermore, the vibration suppressor is integrated with the gearbox, thus causing no increase in the number of parts and not much increase in manufacturing costs.

Incidentally, when the vibration suppressor is formed to have a width greater than or equal to one fourth of a shaft hole diameter and a height greater than or equal to one sixth of the shaft hole diameter, it possible to provide a natural frequency of 2 kHz or more to the gearbox in many cases. However, from a different point of view, in some cases, the vibration suppressor may not always need to be above size, depending on the size and shape of the gearbox, in order to provide a natural frequency of 2 kHz or more to the gearbox. In this case, the vibration suppressor may not be required above size, so long as the gearbox is ensured to have a natural frequency of 2 kHz or more, even in the case of which a corresponding noise suppression effect can also be provided.

Furthermore, as in this exemplary embodiment, it has been confirmed that even in the case where most part (at least one half or more) of the outer shape of the gearbox is formed concentrically with the shafts, a natural frequency of 2 kHz or more can be ensured without exceedingly increasing the size of the vibration suppressor. It has been also confirmed that vibration suppressors having the same size would provide a higher natural frequency to the gearbox.

The present invention provides particularly remarkable noise reduction effects when applied to a comparatively large gearbox with a shaft hole having the smallest diameter of 70 mm or more; however, the invention is also applicable to a smaller gearbox.

Additionally, the present invention does not require that all the components included in the aforementioned exemplary embodiment be always incorporated at the same time. Even only some of the components will also provide a corresponding respective synergistic effect.

The present invention is applicable to a gearbox for use with speed reducers, speed increasers, and differential gearing mechanism such as bevel gears. The present invention provides remarkable noise reduction effects particularly when applied to comparatively large gearboxes, having a shaft hole diameter as large as 70 mm or more, which are widely used for industrial applications.

The disclosure of Japanese Patent Application No. 2005-1809 filed Jan. 6, 2005 including specification, drawing and claim are incorporated herein by reference in its entirety.

What is claimed is:

1. A gearbox having at least three or more shaft holes, said gearbox comprising:
    a vibration suppressor being formed to extend from at least one of the shaft holes in a radial direction of the one shaft hole, wherein,
    the vibration suppressor is configured to ensure a width greater than or equal to one fourth of a shaft hole diameter of the one shaft hole and a height greater than or equal to one sixth of the shaft hole diameter at a highest portion of the vibration suppressor.

2. The gearbox according to claim 1, wherein
    one of the three or more shaft holes has a minimum shaft hole diameter of 70 mm or more.

3. The gearbox according to claim 1, wherein
    a front edge of the shaft hole having the vibration suppressor extending therefrom is located axially outwardly with respect to an axial edge surface of a gear housing portion of the gearbox.

4. The gearbox according to claim 1, wherein
    the vibration suppressor is formed so that the height thereof is reduced with radial distance from the shaft hole.

5. A method for suppressing vibration in a gearbox, said method comprising the steps of:
    providing a gearbox having a plurality of shaft holes;
    forming a vibration suppressor extending from a first shaft hole of the plurality of shaft holes in a radial direction of the first shaft hole, said vibration suppressor being formed to be a width which is greater than or equal to one-fourth of the diameter of the first shaft hole, and formed to have a height which is greater than or equal to one-sixth of the diameter of the first shaft hole at a highest portion of the vibration suppressor.

6. A method for suppressing vibration in a gearbox, said method comprising the steps of:
    providing a gearbox having a plurality of shaft holes;
    forming a vibration suppressor extending from a first shaft hole of the plurality of shaft holes in a radial direction of the first shaft hole, said vibration suppressor being formed with a width which enables a natural frequency of the gearbox to be at least 2 kHz, and formed to have a height which is greater than or equal to one-sixth of the diameter of the first shaft hole at a highest portion of the vibration suppress.

* * * * *